May 1, 1956 G. RAISBECK 2,744,198

TRANSISTOR TRIGGER CIRCUITS

Filed Nov. 2, 1951 2 Sheets-Sheet 1

INVENTOR
G. RAISBECK
BY Harry C. Hart
ATTORNEY

TRANSISTOR TRIGGER CIRCUITS

Filed Nov. 2, 1951 2 Sheets-Sheet 2

INVENTOR
G. RAISBECK
BY Harry C. Hart
ATTORNEY

United States Patent Office 2,744,198

Patented May 1, 1956

2,744,198

TRANSISTOR TRIGGER CIRCUITS

Gordon Raisbeck, Morristown, N. J., assignor to Bell Telephone Laboratories, Incorporated, New York, N. Y., a corporation of New York Application November 2, 1951, Serial No. 254,569

26 Claims. (Cl. 250—36)

This invention relates to circuits employing translating devices in pairs and in particular to novel transistor circuits in which an N-type transistor is paired with a P-type transistor to give new and useful behavior .

The discovery and publication of the transistor as an electric translating device has led to the development of various translating circuits embodying the transistor as an active element. In general, such translating circuits resemble earlier vacuum tube circuits in so far as the transistor is the counterpart of its predecessor, the vacuum tube, and differ in certain respects as required by the differences between the characteristics of the transistor and those of the vacuum tube. An example is found in the transistor trigger circuits which are described in an application of R. L. Wallace, Jr., Serial No. 184,458, filed September 12, 1950, now Patent No. 2,620,448, issued December 2, 1952. It is also described in an article by R. L. Wallace, Jr. and G. Raisbeck, entitled, "Duality as a Guide in Transistor Circuit Design," published in the Bell System Technical Journal for April 1951, volume 30, page 381. So far as is known, in all cases where transistors have been paired, the transistors have been alike in every respect or as nearly so as techniques of fabrication would permit. Such developments follow the example of the pairing of vacuum tubes of like characteristics.

Unlike the tube, however, the point-contact transistor may take two forms, the N-type of the original Bardeen-Brattain Patent 2,524,035, and the newer P-type. The latter is the subject of an application of W. G. Pfann, Serial No. 90,022, filed April 27, 1949. It is described in an article by W. G. Pfann and G. H. Scaff, published in the Proceedings of the Institute of Radio Engineers for October 1950, volume 38, page 1151.

Transistors of the newer so-called "junction" type as disclosed, for example, in an application of W. Shockley Serial No. 354,232 filed June 26, 1948 now Patent 2,569,-347, issued September 25, 1951 and also in the Bell System Technical Journal for July 1949, volume 28, page 435, can also be fabricated in two alternative forms which are known as N-type and P-type respectively.

In general, the operating characteristics of P-type and N-type transistors are of like form but unlike sign. The difference in sign results from the difference in the sign of the carriers, holes or electrons, of principal import in realizing transistor action. Specifically, in N-type devices, such action involves the injection of holes into the body or intermediate zone whereas in P-type devices electrons are injected into the body or intermediate zone. Considering positive current in the conventional sense, i. e., as in the direction opposite to the direction of electron flow, in an N-type transistor such current flows into the block at the emitter and out of it at the collector whereas in a P-type transistor such current flows into the block at the collector and out of it at the emitter. In N-type devices, a positive signal applied to the emitter tends to drive it toward saturation whereas a similar signal applied to the emitter of a P-type device tends to drive it toward its collector voltage cut-off.

The present invention is based on the realization that the discovery of the P-type transistor permits the pairing of circuit elements whose characteristics are alike in shape but opposite in sign where such pairing leads to advantages. It deals in the main with trigger circuits employing transistors in pairs and has for its principal object the improvement of the performance characteristics, including stability, of transistor trigger circuits.

In the classic Eccles-Jordan vacuum tube trigger circuit or multivibrator, two like triode vacuum tubes are employed, the plate of each being connected to the grid of the other. The cathodes may be connected together and solidly grounded. Because of the phase inversion property of the vacuum tube this circuit can rest stably in either of two conditions known as state A and state B. In state A one of the tubes is cut-off while the other is saturated and in state B the reverse is true. In operation, the tubes interchange their roles and a symmetrical output wave form is the result. When it is attempted to duplicate this behavior with a pair of like transistors, the collector electrode of each transistor being coupled to the emitter electrode of the other and the base electrodes being grounded, it is found that, because the transistor does not share the phase inversion property of the tube, the transistors are both cut off at the same time or both saturated at the same time and the result is an asymmetrical output wave form. To introduce the required phase inversion and so obtain a symmetrical output wave form the collector of each transistor may be coupled to the base of the other transistor instead of to its emitter, but now no one electrode of both transistors may be connected solidly to ground and this is in some circumstances a serious objection.

The present invention cures both of these difficulties at once by pairing a P-type transistor with an N-type transistor. The collector of each may now be coupled to the emitter of the other transistor and the base electrodes of both may be solidly grounded. The grounding of one electrode of both transistors, preferably the base electrodes, makes for stability and the oppositeness of sign of the current voltage characteristics of the two transistors has the result that one of them is cut off while the other is saturated, resulting in a symmetrical wave form.

The external circuit in which the two transistors are interconnected may take many forms and the trigger circuits of the invention may be oscillators or multivibrators, or they may be bistable trigger circuits or astable trigger circuits.

The invention will be more fully apprehended from the following detailed description of certain illustrative embodiments thereof, taken in connection with the appended drawings of which:

Figures 1, 2, 3, 4, 5:
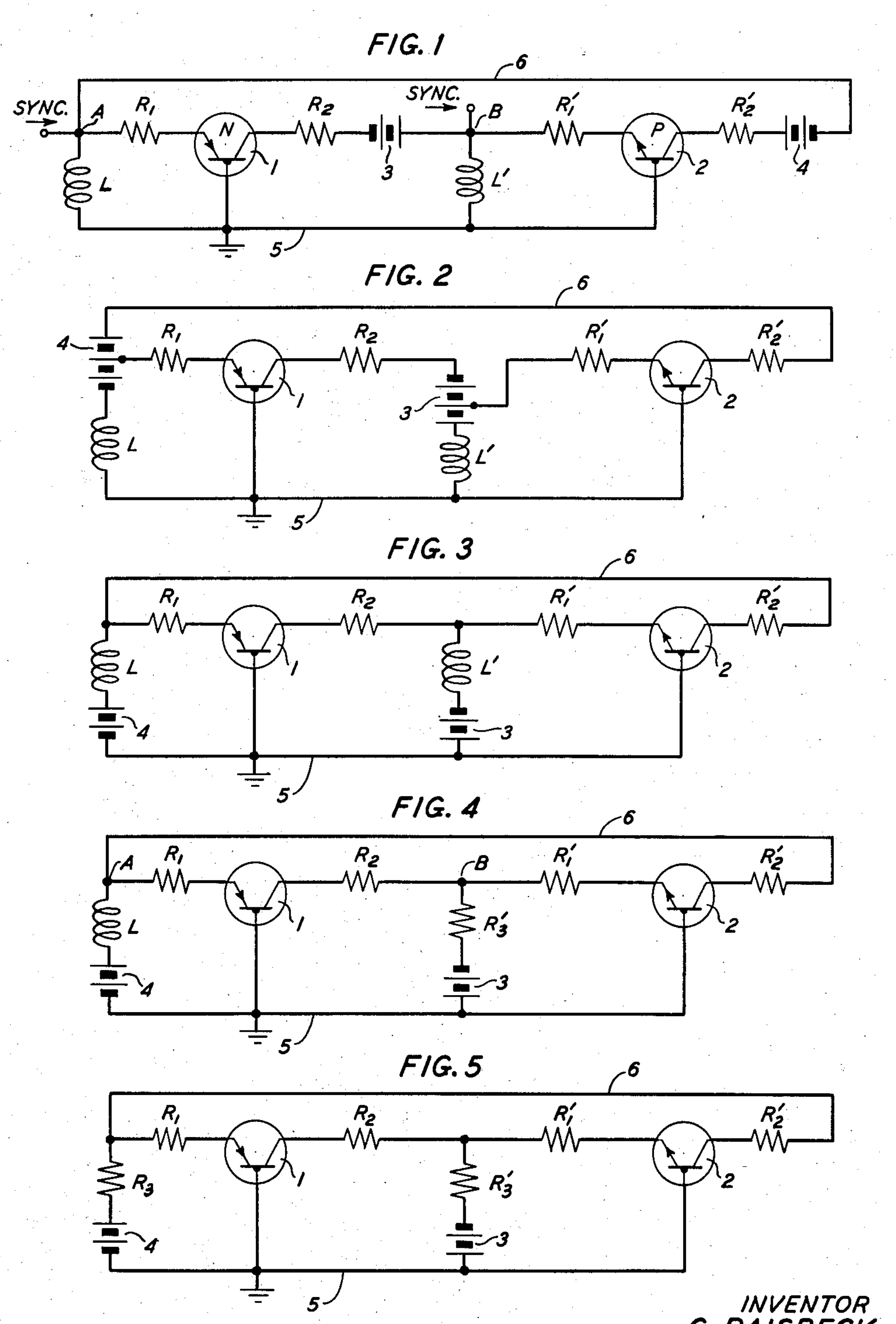
Fig. 1 is a schematic circuit diagram showing a trigger circuit in accordance with the invention arranged for operation as a free-running multivibrator.
Figs. 2 and 3 are schematic circuit diagrams showing modifications of Fig. 1, the biases being supplied by different means.
Fig. 4 is a schematic circuit diagram of a "one-shot" or monostable trigger circuit.
Fig. 5 is a schematic circuit diagram of a bistable or so-called "flip-flop" trigger circuit.
Figures 6, 7, 8, 9, 10:
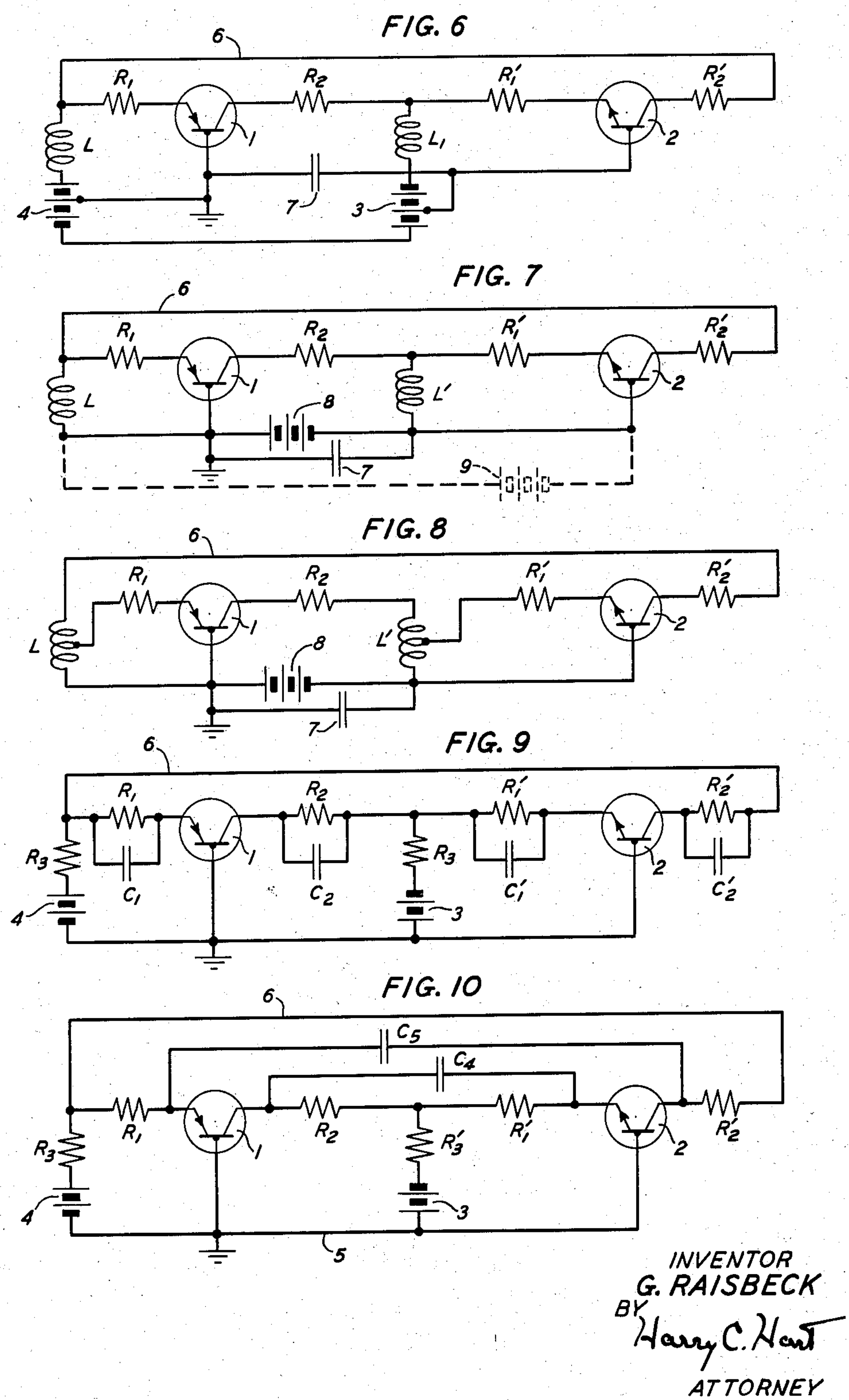
Figs. 6 and 7 are schematic circuit diagrams showing further modifications of the bias voltage supply.

Fig. 8 is a schematic circuit diagram showing a free-running multivibrator in which the loop gain has been increased by the employment of resistance-matching transformers; and Figs. 9 and 10 are schematic circuit diagrams of free-running multivibrators which are modified as compared with the apparatus of Fig. 3 by the employment of interstage coupling by way of series condensers instead of the shunt inductors of Fig. 3.

Referring now to the drawings, Fig. 1 shows an N-type transistor 1 and a P-type transistor 2 whose base electrodes are connected together and to ground. Operating current is supplied to the collector of the N-type transistor 1 by way of a resistor $R_2$ and a choke coil L' from a source such as a battery 3. Similarly operating current is supplied to the collector of the P-type transistor 2 by way of a resistor $R_2'$ and a choke coil L from another source such as a battery 4. The magnitudes of the resistors $R_2$ and $R_2'$ are adjusted in relation to the voltages of the batteries to provide collector operating currents of desired magnitudes. The emitter of the N-type transistor, which is designated by an inwardly-directed arrowhead, is returned to the common base connection 5 by way of the inductance coil L and a resistor $R_1$, while the emitter of the P-type transistor, which is designated by an outwardly-directed arrowhead, is similarly returned to the common base connection 5 by way of the inductance coil L' and another resistor $R_1'$. Adjustment of the magnitudes of the resistors $R_1$ and $R_1'$ in accordance with known principles results in applying emitter bias current to each transistor in the magnitude required for operation.

The collector of the N-type transistor is connected by way of the external collector resistor $R_2$, the battery 3, and the resistor $R_1'$ to the emitter of the P-type transistor. Similarly the collector of the P-type transistor is connected by way of the external collector resistance $R_2'$, the collector supply battery 4, a feedback connection 6, and the resistor $R_1$ to the emitter of the N-type transistor. The junction point between the inductance coil L and the resistor $R_1$ is labelled A on the drawing. Similarly the junction point of the inductance coil L' and the resistor R' is labelled B on the drawing.

The action of the circuit of Fig. 1 may be explained as follows: Suppose that the circuit is initially at rest, the emitter of each transistor drawing normal small bias current, driven by the supply battery 3 or 4. With proper proportioning of the resistors $R_2$ and $R_2'$ in relation to the voltages of the sources, each of these transistors is biased for operation as a class A amplifier, in which condition its current multiplication ratio, $\alpha$, is in excess of unity.

Suppose that a small abrupt disturbance be now applied with positive sign at the point A. This is transmitted by way of the resistor $R_1$ to the emitter of the N-type transistor and it is transmitted by and through this transistor with a current gain of $\alpha$, thence to the emitter of the other transistor, through it with current gain of $\alpha$ and thence along the feedback conductor 6 and so around the loop and back to the point A where it appears in its original phase and amplified approximately by $\alpha^2$. This current continues until one or both of the transistors has been driven, by the increase of the current flowing through it, into a condition in which it is no longer capable of exhibiting current gain. Because the original disturbance was a positive one, the N-type transistor 1 has been driven toward higher emitter current, i. e., towards its collector voltage cut-off, while the P-type transistor 2, whose characteristics are opposite in sign to those of the N-type transistor, has been driven in the opposite direction, namely, toward reduced emitter current or collector voltage saturation.

While this transient change of conditions is in progress the current gain of each stage is close to the current gain factor, $\alpha$, of the transistor itself, and this is for the reason that each of the inductance coils L and L' presents a very high impedance to a short burst of current. In order not unduly to attenuate this transient signal, the various series resistors are preferably sufficiently small compared to the internal collector resistances of the transistors.

As time elapses the voltages built up across the inductance coils L, L' can no longer be sustained and each of these coils commences to pass current which increases exponentially with a time constant determined, for the N-type transistor 1, by the magnitudes of the coil L, the resistor $R_1$ and its emitter resistance and for the P-type transistor 2, by the magnitudes of the coil L', the resistor $R_1'$ and its emitter resistance. This permits the emitter currents to tend to return to their original conditions of class A operation. However, as the class A condition is approached, each transistor becomes once more capable of exhibiting current gain and as soon as the loop gain exceeds unity a cycle occurs which is the same as the one outlined above with the exception that the disturbance appearing at the point A is now negative in sign. This leads to a state of affairs in which the N-type transistor 1 is this time driven toward its collector voltage saturation condition and the P-type transistor 2 is driven towards its collector voltage cut-off. Such cycles then follow one another in alternation, the decay of each providing the disturbance which starts the next.

The frequency of self-oscillation of the circuit can be varied by altering the magnitudes of the controlling parameters L, $R_1$, L' or $R_1'$.

The apparatus of Fig. 1 can be synchronized with an external pulse source, for example by applying a current, preferably from a high impedance source, to the point A, the point B or to both. If the circuit is to be employed as a frequency divider, odd subharmonics of the synchronizing source current may be favored by feeding the synchronizing currents to the points A and B in phase coincidence while, similarly, even harmonics may be favored by feeding the synchronizing currents to the points A and B in phase opposition.

Fig. 2 shows a circuit which is modified as compared with that of Fig. 1 only in that a portion of each of the supply current sources 3, 4 is employed to bias the emitter of one of the transistors. This tends to insure that, at the conclusion of the cycle described above, both transistors will tend to return to the condition of normal class A operation in which the current gain of each transistor exceeds unity. The frequency of oscillation of the circuit of Fig. 2 can be varied by altering the magnitudes of the controlling parameters as described in connection with Fig. 1 and also by varying the potentials of the taps of the batteries 3, 4, to which the emitters are returned.

Fig. 3 shows an alternative form of the invention in which one terminal of each of the batteries 3, 4 is connected to ground. It is notable that, because the biases required by the electrodes of the P-type transistor 2 are opposite in sign to those required by the electrodes of the N-type transistor 1 a single battery 4 positively poled with respect to ground, may conveniently supply the emitter bias of the N-type transistor 1 and the collector bias of the P-type transistor 2 while another single battery 3, negatively poled with respect to ground may conveniently supply the collector bias of the N-type transistor 1 and the emitter bias of the P-type transistor 2. In each case the magnitudes of the biasing currents may be adjusted in accordance with known principles by the proportioning of the resistors $R_1$, $R_2$, $R_1'$ and $R_2'$. Such correct proportioning calls for large values of $R_1$ and $R_1'$ while as a practical matter the resistors $R_2$ and $R_2'$ may be so small as to be insignificant and these resistors may indeed be omitted all together.

Like the apparatus of Fig. 1, those of Figs. 2 and 3 are free-running oscillators. They may be synchronized with an external source as in the case of the circuit of Fig. 1. When on the other hand, either one of the inductance coils L or L' is replaced by a resistor the circuit ceases to be free running. In the circuit of Fig. 4, which is otherwise the same as Fig. 3, the inductance coil L' is replaced by a resistor $R_3'$. A disturbance applied at the point B acts as before to drive the P-type transistor 2 through its cycle to collector voltage cut-off and the N-type transistor 1 to collector voltage saturation, and this furnishes a disturbance at the point A to drive the system back again. But with the substitution of the resistor $R_3'$ for the coil L', when the N-type transistor 1 is now driven toward collector voltage cut-off and the P-type transistor 2 is driven toward collector voltage saturation, there is no tendency for the circuit to take any further action because there is now only a negligible voltage across the coil L, whose decay would constitute a new tripping disturbance. In other words, the voltage drop which now appears across the coil L may have a zero value without change of state. The voltage drop across the resistor $R_3$ may remain high because it carries the large collector current drawn by the N-type transistor 1 while the emitter current through the P-type transistor 2 remains small. Hence the condition in which the N-type transistor 1 draws a large collector current and the P-type transistor 2 draws a small collector current is a stable condition. On the other hand, when the opposite is true the action of the coil L comes into play as described above, so that the condition in which the N-type transistor is driven toward collector voltage saturation and the P-type transistor is driven toward collector voltage cut-off is an unstable condition. Thus the circuit of Fig. 4 is monostable. It may be tripped, by the application of a positive disturbance to the point A or a negative one to the point B, whereupon it goes through a single full cycle and returns to the condition in which the N-type transistor rests at collector voltage cut-off and the P-transistor rests at collector voltage saturation.

In Fig. 5 both of the coils L and L' of Fig. 3 have been replaced by the resistors $R_3$ and $R_3'$, respectively. Now both of the two conditions are stable ones and the circuit can rest quietly either with the N-type transistor 1 at collector voltage cut-off and the P-type transistor 2 at collector voltage saturation or at the other condition in which the roles of the two transistors are interchanged. It cannot rest at any intermediate condition because any fortuitous disturbance, no matter how small, is amplified and fed around the loop in regenerative fashion to drive the system to one or the other of its two end conditions. Hence the circuit of Fig. 5 is bistable. It may be tripped from either one of its stable conditions to the other by the application of a tripping pulse to the point A or to point B, whereupon it goes through a single cycle as described in connection with Fig. 1; but, because the circuit contains no inductances to alternately sustain a voltage and to release it, the circuit then remains in the condition to which it has been driven.

In the circuits of Figs. 4 and 5 the resistors $R_1$, $R_2$ and $R_3$ are preferably proportioned in relation to each other in such a fashion that the loss of signal in these resistors is not excessive while at the same time the emitter bias is of a suitable magnitude. The first condition requires, for the N-type transistor 1, that $R_3'$ be large compared with the internal collector resistance of that transistor and that the resistors $R_2$ and $R_1$ be small compared with the internal collector resistance. For ordinary transistors of moderate current gain, the second condition requires that the resistor $R_1$ be large as compared with the resistor $R_2$. Taking both conditions together there results the requirement $$R_2 < R_1 < R_3'$$

These relations are easy to satisfy in practice since, as above noted, the resistor $R_2$ is included mainly for the sake of generality and exposition and may in practice be omitted all together.

For the same reasons, applied to the P-type transistor, it is desirable that the three remaining resistors be relatively proportioned in the order $$R_2' < R_1' < R_3$$

The operating biasing voltage required by the collector of a transistor is many times greater than that required by its emitter, and this applies to P-type transistors as well as to N-type transistors. In Figs. 1 through 5 bias voltage sources have been provided which are large enough to supply the necessary collector voltage and this voltage is reduced for the emitters by way of the comparatively large resistors $R_1$ and $R_1'$.

The large resistance values of these external emitter resistances may be reduced, with consequent increase of the current gain around the feedback loop, by returning the base electrode of each transistor to a suitably located tap on its bias battery in the manner shown in Fig. 6. The emitter voltage for each transistor is now only that derived between one end terminal of its battery and the tap, while collector voltage for each transistor is derived from the whole of one battery and a part of the other. It is, of course, a consequence of this arrangement that both of the base electodes may no longer be solidly connected to ground. One of them may still be grounded for all purposes, while the other may be grounded for signal frequencies by way of a bypass condenser 7.

Location of this base electrode tap of Fig. 6 at the extreme ends of the respective batteries results in coalescing the two batteries 3, 4 into a single battery 8 as shown in Fig. 7. The emitter bias voltage is now only that due to the flow of the small residual emitter current in the case of each transistor, but with many transistors this small bias current suffices for operation. One of the base electrodes may be solidly connected to ground while the other is grounded for signal frequencies by way of a blocking condenser 7.

The circuit of Fig. 7 appears superficially to be asymmetrical. When the portion indicated in broken lines is added it at once becomes symmetrical. Now, however, the battery 9 shown in broken lines is connected directly in parallel with the battery 8 shown in solid lines and may, therefore, be entirely omitted in practice. Hence the apparent asymmetry is of no consequence.

In the circuit of Fig. 7 the collector of each transistor feeds its output directly and without impedance transformation into the emitter of the other transistor. Because transistor collector resistances are as a rule high while their emitter resistances are generally much lower, an impedance mismatch is present at two points and tends to restrict the loop gain. This situation can be cured by the use of impedance transformers as shown for example in Fig. 8. Here the emitter of the N-type transistor 1 is connected to a tap suitably located on the coil L and the emitter of the P-type transistor 2 is similarly connected to a tap suitably located on the coil L'. The tapping points on the coils may be selected in accordance with known principles of transformer design to match the output impedance of each transistor to the input impedance of the other.

In the free-running multivibrators described above the action depends on the use of coupling networks which pass high frequencies easily but introduce large losses for steady signals; e. g., the shunt inductance coils L and L'. But the same action may be secured by the use of other networks. Figs. 8 and 9 show two forms of such networks. In the former each of the series resistors $R_1$, $R_2$, $R_1'$ and $R_2'$ is shunted by a condenser, and the time constants of the various resistor-condenser combinations are selected to pass brief spurts of energy easily, while presenting high impedance for steady signals. This arrangement, therefore, meets the requirement for a free-running multivibrator. From an external point of view its operation is the same as that of Fig. 1. Its step-by-step behavior differs only in so far as the action of the resistor-condenser combination differs from, but is parallel to, that of the inductance coils.

Fig. 10 shows a variant of Fig. 9 in which the condensers $C_2$ and $C_1'$ are replaced by a single condenser $C_4$ while the condensers $C_1$ and $C_2'$ are similarly replaced by a single condenser $C_5$. The action of the circuit is similar to that of Fig. 9. Because the principal path for the transient signal from the N-type transistor 1 to the P-type transistor 2 is by way of the condenser $C_4$, the resistor $R_3'$ is not essential. Similarly the condenser $C_5$ removes the need for the resistor $R_3$.

The employment in a trigger circuit of two devices whose characteristics are the same in shape but opposite in sign, e. g., transistors of unlike conductivity types, gives rise to new and advantageous results which are not obtainable with circuits employing a pair of devices which are alike in all particulars whether they be vacuum tubes, transistors, or otherwise. In such prior art circuits waves of similar shape and spaced one full cycle apart in time are found at appropriate points of the circuit, but they are always of like polarity. With circuits employing unlike devices, e. g., transistors of opposite conductivity types, wave shapes appear at corresponding points of the two transistor stages which have similar shapes, are located one-half cycle apart in time and are of opposite polarities. In other words, the output wave as a whole is symmetrical not only along the time axis but also about the zero value of current or voltage. Such double symmetry of wave shape is of distinct advantage in certain connections.

What is claimed is:

1. A trigger circuit for generating output waves of symmetrical form which comprises a pair of signal translating devices each of which has an input electrode, an output electrode and a common electrode, one of said devices being characterized by voltage-current characteristics which are like those of the other device in shape but opposite in sign, the common electrodes of said devices being directly connected together and to a point of fixed potential, and the output electrode of each device being connected to the input electrode of the other device, whereby the shifts of one of said devices from a cut-off state to a saturation state take place in alternation with like shifts of the other of said devices.

2. Apparatus as defined in claim 1 wherein each of said devices is a transistor.

3. Apparatus as defined in claim 2, wherein each of said two transistors comprises a semiconductive body and wherein said bodies are constructed of materials of opposite conductivity types.

4. A trigger circuit for generating output waves of symmetrical form which comprises an N-type transistor and a P-type transistor, each of which comprises a semiconductive body, an emitter electrode, a collector electrode and a base electrode, said base electrodes being directly connected together and to a point of fixed potential, the collector electrode of each transistor being connected to the emitter electrode of the other transistor, whereby the shifts of each one of said transistors from a cut-off state to a saturation state takes place in alternation with like shifts of the other of said transistors.

5. A multivibrator which comprises a trigger circuit as defined in claim 4, and an inductance coil interconnecting the base electrode of each transistor with its emitter electrode.

6. A monostable trigger circuit which comprises apparatus as defined in claim 4, an inductance coil interconnecting the base electrode of one transistor with its emitter electrode and a resistor interconnecting the base electrode of the other transistor with its emitter electrode.

7. A bistable trigger circuit which comprises apparatus as defined in claim 4, and a resistor interconnecting the base electrode of each transistor with its emitter electrode.

8. In combination with apparatus as defined in claim 4, means for applying operating biases to the electrodes of said transistors which comprises a first potential source whose positive terminal is connected to the collector electrode of the P-type transistor and to the emitter electrode of the N-type transistor and a second potential source whose negative terminal is connected to the collector electrode of the N-type transistor and to the emitter of the P-type transistor.

9. In combination with apparatus as defined in claim 4, means for applying operating biases to the electrodes of said transistors which comprises a first potential source whose negative terminal is connected to the fixed potential point and whose positive terminal is connected to the collector electrode of the P-type transistor and to the emitter electrode of the N-type transistor and a second potential source whose positive terminal is connected to said fixed potential point and whose negative terminal is connected to the collector electrode of the N-type transistor and to the emitter electrode of the P-type transistor.

10. In combination with apparatus as defined in claim 5, means for applying operating biases to the electrodes of said transistors which comprises a potential source having its positive terminal connected to the base electrode of the N-type transistor and its negative terminal connected to the base electrode of the P-type transistor.

11. A multivibrator which comprises a trigger circuit as defined in claim 4 in which the connection of the collector electrode of one transistor to the emitter electrode of the other transistor is by way of a parallel combination of a resistor and a condenser.

12. A multivibrator which comprises an N-type transistor and a P-type transistor each of which includes a semiconductive body, an emitter electrode, a collector electrode, and a base electrode, the collector electrode of each transistor being returned to its base electrode by way of a bias supply source and an inductance coil having a tap, and in which the emitter electrode of each transistor is connected to the tap of that inductance coil which interconnects the collector and base electrodes of the other transistor.

13. A multivibrator which comprises an N-type transistor and a P-type transistor, each of which includes a semiconductive body, an emitter electrode, a collector electrode, and a base electrode, the collector electrode of the N-type transistor being returned to its base electrode by way of a first inductance coil having a tap, the collector electrode of the P-type transistor being returned to its base electrode by way of a second inductance coil having a tap, the emitter electrode of the N-type transistor being connected to the tap of the second inductance coil, the emitter electrode of the P-type transistor being connected to the tap of the first inductance coil, and a common bias supply source having its positive terminal connected to the base electrode of the N-type transistor and its negative terminal to the base electrode of the P-type transistor.

14. A trigger circuit for generating output waves of symmetrical form which comprises an N-type transistor and a P-type transistor, each of which includes a semiconductive body, an emitter electrode, a collector electrode and a base electrode, means for applying operating potentials to said electrodes, said base electrodes being connected directly together and to a point of fixed potential, the emitter electrode of one of said transistors being connected by way of a first impedance element to said fixed potential point, the emitter electrode of the other of said transistors being connected by way of a second impedance element to said fixed potential point, the collector electrode of each transistor being connected to the emitter electrode of the other transistor, whereby the shifts of one of said transistors from a cut-off state to a saturation state take place in alternation with like shifts of the other of said transistors.

15. Apparatus as defined in claim 14 wherein each of said impedance elements comprises an inductance coil.

16. Apparatus as defined in claim 14 wherein each of said impedance elements comprises a resistor.

17. Apparatus as defined in claim 14 wherein each of said impedance elements comprises an inductance coil and a resistor connected together in series arrangement.

18. Apparatus as defined in claim 14 wherein at least one of said impedance elements comprises an inductance coil.

19. Apparatus as defined in claim 14 wherein the connection of the collector electrode of each transistor to the emitter electrode of the other transistor is by way of a resistor.

20. Apparatus as defined in claim 14 wherein said operating potential supplying means comprises a potential source of one polarity interconnecting the collector electrode of the first transistor with the emitter electrode of the second transistor and a potential source of opposite polarity interconnecting the collector electrode of the second transistor with the emitter electrode of the first transistor.

21. Apparatus as defined in claim 14 wherein only one of said impedance elements comprises an inductance coil.

22. Apparatus as defined in claim 14 wherein said operating potential supplying means comprises a potential source of one polarity connected in series between said fixed potential point and the emitter electrode of the first transistor and a potential source of opposite polarity connected in series between said fixed potential point and the emitter electrode of the second transistor.

23. Apparatus as defined in claim 14 wherein each of said impedance elements comprises two resistors connected together in series arrangement and a condenser in shunt with one of said two resistors.

24. Apparatus as defined in claim 14 wherein at least one of said impedance elements comprises two resistors connected together in series arrangement, a terminal thus being common to said two resistors, and a condenser connected in shunt with that one of said two resistors which is connetced between the emitter electrode of the transistor and said common terminal.

25. Apparatus as defined in claim 24 wherein the connection of the collector electrode of one transistor to the emitter electrode of the other transistor is by way of a conductor which extends from the collector electrode of said one transistor to said common terminal.

26. In combination with apparatus as defined in claim 25, a resistor connected in series arrangement with said conductor and a condenser connected in shunt with said resistor.

References Cited in the file of this patent

UNITED STATES PATENTS

| | | |
|---|---|---|
| 2,531,076 | Moore | Nov. 21, 1950 |
| 2,569,345 | Shea | Sept. 25, 1951 |
| 2,620,448 | Wallace | Dec. 2, 1952 |
| 2,666,819 | Raisbeck | Jan. 19, 1954 |

OTHER REFERENCES

Article: "The -p-Germanium Transistor," by Pfam et al.; Proc. IRE, vol. 38, pages 1151–1154, October 1950.